United States Patent [19]

Beneteau

[11] Patent Number: 4,615,067
[45] Date of Patent: Oct. 7, 1986

[54] WIPER ARM

[75] Inventor: Christian Beneteau, Gorcy, France

[73] Assignee: Champion Spark Plug Europe S.A., Virton, Belgium

[21] Appl. No.: 670,631

[22] Filed: Nov. 13, 1984

[30] Foreign Application Priority Data

Nov. 17, 1983 [FR] France .................. 83 18288

[51] Int. Cl.4 .................. B60S 1/32
[52] U.S. Cl. .................. 15/250.2; 15/250.35
[58] Field of Search ............. 15/250.2, 250.35–250.42

[56] References Cited

U.S. PATENT DOCUMENTS

| 1,371,363 | 3/1921 | Gillet | 15/250.34 X |
| 2,230,596 | 2/1941 | Horton | |
| 2,257,692 | 9/1941 | Kellogg | |
| 2,619,668 | 12/1952 | Sivacek | |
| 3,131,412 | 5/1964 | McClain et al. | 15/250.35 |
| 3,344,458 | 10/1967 | Deibel | 15/250.35 |
| 4,463,471 | 8/1984 | Zorn | |

FOREIGN PATENT DOCUMENTS 1409802  7/1965  France .................. 15/250.42

Primary Examiner—Peter Feldman
Attorney, Agent, or Firm—Wood, Dalton, Phillips, Mason & Rowe

[57] ABSTRACT

A windshield wiper arm of conventional construction, i.e. having a mounting head, a channel portion pivoted to the mounting head, and an arm extension connected to the channel; and has at least one spring made of an elastomer. The elastomer spring is mounted in the channel of the wiper arm to operate in compression tension or as a leaf spring to urge a wiper blade affixed at the outer end by the arm toward the windshield. The elastomer spring may be in the shape of a cylinder or pseudo-cylinder and may operate in linear or volumetric compression.

8 Claims, 14 Drawing Figures

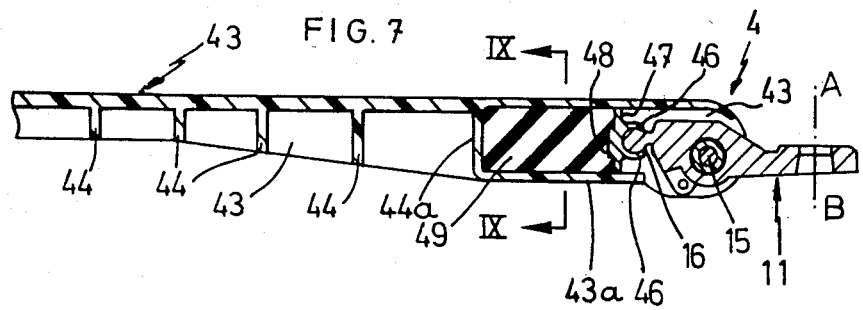
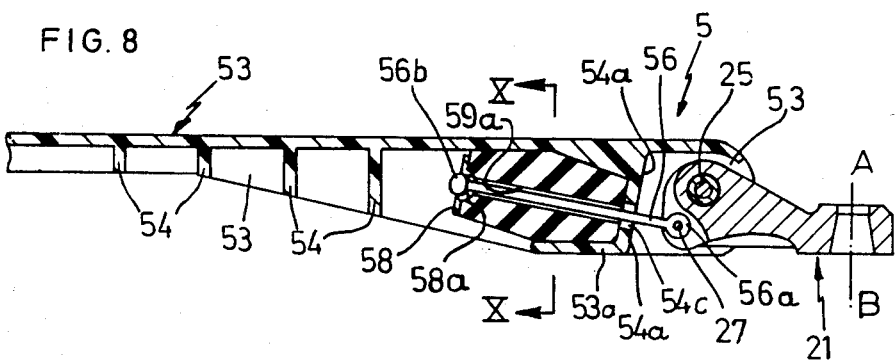
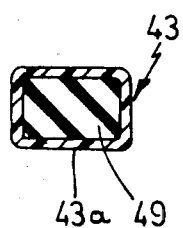
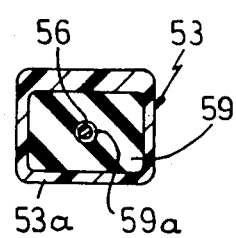

WIPER ARM

DESCRIPTION

1. Field of the Invention

The present invention relates to a wiper arm for wiper blades, and more particularly to a wiper arm having at least one elastomer spring for biasing the wiper blade with a sufficient force onto, for example, the windshield of a motor vehicle.

2. Background of the Invention

The wiper arms of this type, known in prior art, generally comprise (a) a mounting head attached to a drive shaft which imposes an oscillating movement to the wiper arm, (b) an arm extension at the free end of which the wiper blade is attached to, (c) one or more coil springs which link the mounting head to said arm extension, and (d) an exterior housing (or channel) which surrounds at least partially the mounting head, the coil spring or springs and the arm extension. The exterior housing and the arm extension are rigidly linked together and are capable of rotating about an axis provided in the mounting head, perpendicularly to the drive shaft. The function of the coil spring or springs is to bias the wiper blade onto the surface to be wiped in swinging the exterior housing and the arm extension with respect to the mounting head.

Known wiper arms of the above defined type are, for example, disclosed in German (DE) Pat. No. 23 56 606 and in U.S. Pat. No. 4,050,832. These two patents show all the above mentioned components with the essential difference that the wiper arm described in the German patent comprises only one coil spring, while the wiper arm described in the U.S. patent comprises two coil springs.

It is to be noted that practically all prior art wiper arms are completely made out of steel, except for the mounting head which generally is made out of a special alloy. For this reason the conventional wiper arms are relatively heavy.

On the other hand, the conventional wiper arms are often of a relatively complex structure because they include other components than those mentioned above. The result of this is that (a) the mounting operations become more complicated, and (b) the manufacturing costs increase.

As to the steel coil springs of the conventional wiper arms, they have the following disadvantages: (a) the mounting operations are sometimes difficult, (b) when working, they sometimes cause trouble because of friction problems, (c) it is difficult or impossible to mount springs with different forces into a wiper arm of given dimensions, and (d) the price of a steel coil spring is relatively high.

THE INVENTION

The object of the present invention is to provide a wiper arm for wiper blades which eliminates most of the above mentioned disadvantages, i.e. more particularly the disadvantages which are due to the presence of one or more steel coil springs.

In order to reach this objective, the present invention is substantially characterized by the fact that said spring of the wiper arm is made of an elastomer which, preferably, is a cellular polyurethane.

According to another characteristic of the invention, the exterior housing (or channel) of the wiper arm may be in direct contact with said elastomer spring or springs, which feature generally does not exist on conventional wiper arms provided with steel coil springs.

The elastomer spring according to the invention has substantially the general form of a cylinder or of a pseudo-cylinder and, depending on the embodiment, works either as a linear compression, or as a volumetric compression, or as a tension, or as a deflection spring.

The main advantage of the elastomer springs are: simple manufacture at low costs; easy mounting on a steel or on a plastic wiper arm; possibility to mount, on a given wiper arm, springs with different forces in using elastomers of different density; possibility to give adequate forms to the springs for wiper arms of different forms; possibility to identify springs of different forces by different colors; very good fatigue resistance and absolute resistance to corrosion; and small permanent depression and characteristics which change little with temperature.

BRIEF DESCRIPTION OF THE DRAWINGS

The invention will now be described in conjunction with the drawings wherein:

FIG. 7 is a longitudinal section of a wiper arm according to a fourth embodiment of the invention;

FIG. 8 is a longitudinal section of a wiper arm according to a fifth embodiment of the invention;

FIG. 9 is a section along line IX—IX of the wiper arm of FIG. 7;

FIG. 10 is a section along line X—X of the wiper arm of FIG. 8;

DETAILED DESCRIPTION OF THE INVENTION

Figure 1:
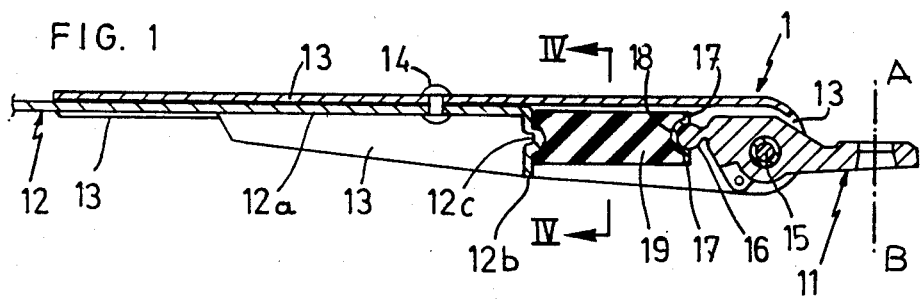
FIG. 1 is a longitudinal section of a wiper arm according to a first embodiment of the invention.
Figure 2:
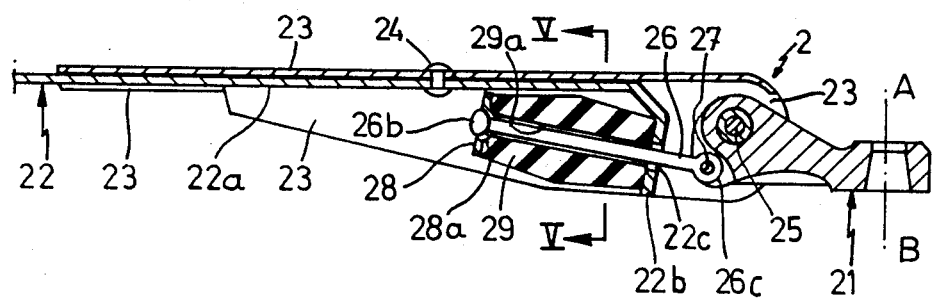
FIG. 2 is a longitudinal section of a wiper arm according to a second embodiment of the invention.
Figure 3:
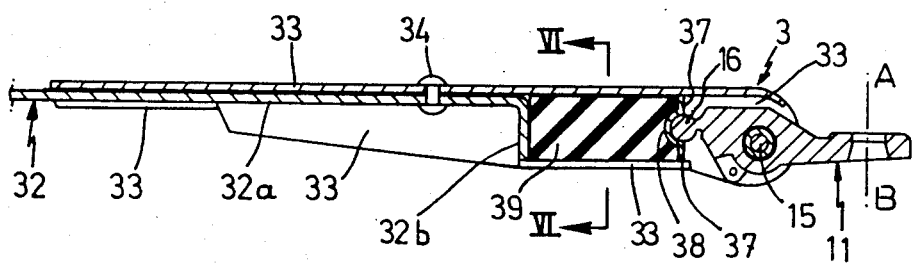
FIG. 3 is a longitudinal section of a wiper arm according to a third embodiment of the invention.
Figure 11:
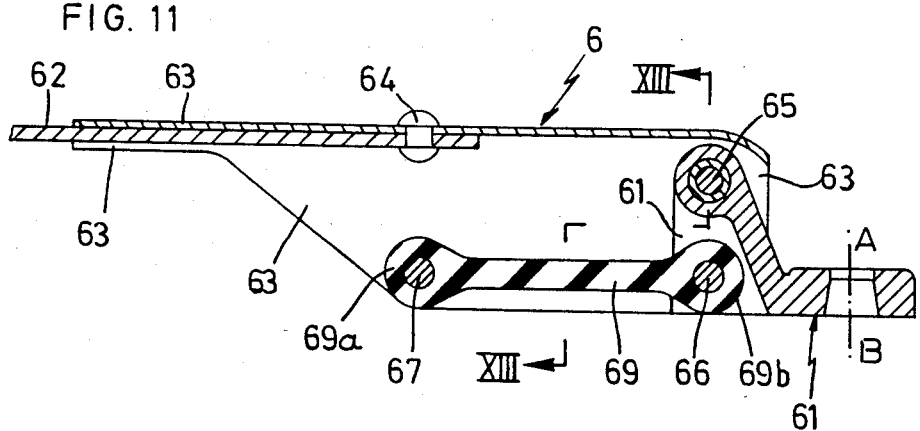
FIG. 11 is a longitudinal section of a wiper arm according to a sixth embodiment of the invention.
Figure 12:
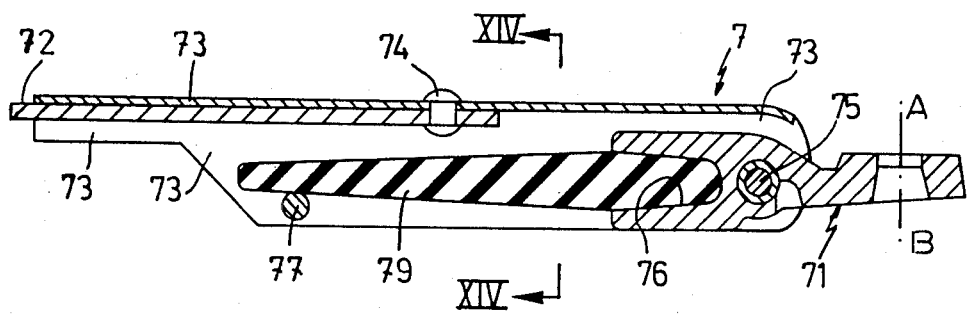
FIG. 12 is a longitudinal section of a wiper arm according to a seventh embodiment of the invention.

FIGS. 1 and 2 show two steel wiper arms 1,2 wherein the elastomer springs 19,29 work as linear compression springs. FIG. 3 shows a steel wiper arm 3 wherein the elastomer spring 39 works as a volumetric compression spring. FIGS. 7 and 8 show two plastic wiper arms 4,5 wherein the elastomer springs 49,59 work as volumetric compression springs. FIG. 11 shows a steel wiper arm 6 wherein the elastomer spring 69 works as a tension spring. Lastly, FIG. 12 shows a steel wiper arm 7 wherein the elastomer compression spring 79 works as a deflection spring (or leaf spring).

Figure 4:
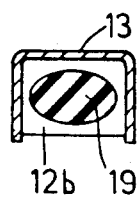
FIG. 4 is a section along line IV—IV of the wiper arm of FIG. 1.

In the first embodiment of the invention, shown in FIGS. 1 and 4, the wiper arm substantially comprises a mounting head 11, an elastomer spring 19, an arm extension 12 and an exterior housing (or channel) 13 which surrounds, at least partially, the three other components of the wiper arm 1. The rivet 14 links together the arm extension 12 and the exterior housing 13, said two components 12,13 being linked to the mounting head 11 by means of the hinge 15. When the drive shaft, represented in all Figures by its axis A-B, imposes an oscillating movement to the mounting head 11, the whole wiper arm 1 oscillates about the axis A-B of the drive shaft.

The arm extension 12 comprises a portion 12a which is parallel to the top wall of the exterior housing 13 and a portion 12b which is substantially perpendicular to said same top wall of the exterior housing 13. In its center portion the portion 12b of the arm extension 12 is provided with semi-cylindrical or semi-spherical projection 12c directed towards the mounting head 11. In its portion, which is opposed to the drive shaft A-B, the mounting head 11 is provided with a cylindrical or spherical projection 16. Between the two thus defined projections 12c, 16 is located the elastomer spring 19 which, at its extremity nearest to the projection 16, comprises a metallic element 17 provided with a semi-cylindrical or semi-spherical recess 18 which form an axis of rotation or a point of rotation with the projection 16 of the mounting head 11.

The mounting head being stationary, when the arm extension 12 and the exterior housing 13 is turned clockwise about the hinge 15, the elastomer spring 19 follows this movement and is more and more compressed, since the respective axis of rotation 15,16 of the exterior housing 13 and of the elastomer spring 19 do not coincide. In other words, when, in a certain angular position of the exterior housing 13 with respect to the mounting head 11, said exterior housing 13 and consequently the arm extension 12 is released, the elastomer spring 19 pushes these two elements 12,13 and the wiper blade (which is attached to the free end of the arm extension 12) counterclockwise, i.e. towards the surface to be wiped.

Figure 5:
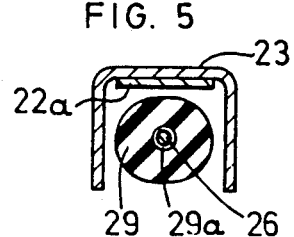
FIG. 5 is a section along line V—V of the Wiper arm of FIG. 2.

In the second embodiment of the invention (FIGS. 2 and 5) the wiper arm 2 comprises substantially the same elements as the wiper arm 1 of the first embodiment, i.e. a mounting head 21, an elastomer spring 29, an arm extension 22 and an exterior housing 23, the two last mentioned elements being rigidly linked together by the rivet 24. Just as before, the mounting head 21 comprises a hinge 25 for the exterior housing 23 and a hinge 27 for the elastomer spring 29.

The arm extension 22 comprises a portion 22a which is parallel to the upper wall of the exterior housing 23 and a portion 22b, which is substantially perpendicular to said same upper wall of the exterior housing 23. In this embodiment, the elastomer spring 29, however, is not located between the portion 22b of the arm extension 22 and the mounting head 21, but it is located on the left side (in FIG. 2) of said two elements 22b,21 and it is provided in its axial center portion with a cylindrical opening 29a to which corresponds a cylindrical opening 22c in the portion 22b of the arm extension 22.

A rod 26 is located in said cylindrical opening 29a of the elastomer spring 29. The rod 26 is, at one of its extremities, linked to the axis of the hinge 27 of the mounting head 21 by means of an ear 26a and, at the other of its extremities, it comprises a substantially semi-cylindrical or semi-spherical reinforcement 26b of which the diameter is substantially larger than the diameter of the cylindrical opening 29a of the elastomer spring 29. On the side of the reinforcement 26b, the elastomer spring 29 may be provided with a metallic part 28 provided either with a semi-cylindrical or with a semi-spherical recess 28a, as the case may be.

The wiper arm 2 works exactly in the same way as the wiper arm 1, i.e. that the elastomer spring 29 pushes the arm extension 22, and consequently the wiper blade, towards the surface to be wiped. It is to be noted that in the two cases (arm 1 and arm 2) the elastomer springs 19,29 are not in direct contact with their respective exterior housings 13,23 and that consequently they work as linear compression springs, as opposed to volumetric compression springs.

Figure 6:
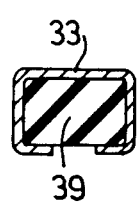
FIG. 6 is a section along line VI—VI of the wiper arm of FIG. 3.

The third embodiment of the invention is represented in FIGS. 3 and 6 and in this case the elastomer spring 39 works as a volumetric compression spring. Said third embodiment of the invention is rather similar to the first embodiment (FIGS. 1 and 4) and the wiper arm 3 substantially comprises a mounting head 11, an elastomer spring 39 and an arm extension 32 rigidly linked (in its portion 32a) to the exterior housing 33 by means of the rivet 34.

The mounting head 11 comprises a hinge 15 for the exterior housing 33 and cylindrical or spherical projection 16, which forms a hinge between the mounting head 11 and the elastomer spring 39 in cooperating with the metallic part 37, which is a part of the elastomer spring 39 and which is provided with a semi-cylindrical or with a semi-spherical recess 38. The elastomer spring 39 is located between the projection 16 of the mounting head 11 and the portion 32b of the arm extension 32.

The essential difference between the embodiments of FIGS. 1,4 and of FIGS. 3,6 is the fact that in the embodiment of FIGS. 3,6 the elastomer spring is in direct contact, over most of its circumferential surface, with the exterior housing 33, as can be seen more particularly in FIG. 6. The elastomer spring 39 is thus completely imprisoned between the metallic walls 33,32b and 37, the last-mentioned wall 37 being capable of longitudinal displacement with respect to the exterior housing 33 in compressing the elastomer spring 39 when the exterior housing 33 and the arm extension 32 are turned clockwise about the hinge 15.

FIGS. 7 and 9 show the fourth embodiment of the invention. This embodiment is practically the same as the embodiment of FIGS. 3 and 6, except that the wiper arm 4 is partially made of an appropriate plastic material, instead of steel.

The wiper arm 4 substantially comprises a mounting head 11, an elastomer spring 49 and a properly so called plastic wiper arm which forms the exterior housing 43,43a and which is provided with reinforcing ribs 44,44a. The elastomer spring 49 is located in a cavity formed by the exterior housing 43,43a and by the reinforcing rib 44a and comprises, at its extremity which is nearest to the mounting head 11, a metallic part 47 capable of longitudinal displacement in the cavity of the elastomer spring 49.

Just as in the case of FIG. 3, the mounting head 11 comprises a first hinge 15 about which the exterior housing 43 may rotate and a second hinge 16 (cylindrical or spherical projection) about which the part 47 of the elastomer spring 49 may slightly rotate since said part 47 is provided with a semi-cylindrical or semi-spherical recess 46 corresponding to the projection 16 of the mounting head 11. The wiper arm 4 works exactly in the same manner as the wiper arm 3.

The fifth embodiment of the invention is shown in FIGS. 8 and 10 and is rather similar to the embodiment of FIG. 2, except that certain parts of the wiper arm 5 are made of an appropriate plastic material and that the elastomer spring 59 works as a volumetric compression spring, instead of a linear compression spring (FIG. 2).

The wiper arm 5 substantially comprises a mounting head 21, an elastomer spring 59 and a properly so called plastic wiper arm which forms the exterior housing 53,53a and which is provided with reinforcing ribs 54,54a. The elastomer spring 59 is located in a cavity formed by the exterior housing 53,53a and by the reinforcing rib 54a and comprises in its axial central portion a cylindrical opening 59a to which corresponds a cylindrical opening 54c in the reinforcing rib 54a.

A rod 56 is located in said cylindrical opening 59a, said rod 56 at one of its extremities is linked to the axis of the hinge 27 of the mounting head 21 by means of an ear 56a and at the other of its extremities comprises a substantially semi-cylindrical or semi-spherical reinforcement 56b of which the diameter is substantially larger than the diameter of the cylindrical opening 59a of the elastomer spring 59. On its extremity nearest to the reinforcement 56b of the rod 56, the elastomer spring 59 may be provided with a metallic part 58 which, as the case may be, is provided with a semi-cylindrical or with a semi-spherical recess 58a.

The wiper arm 5 works in exactly the same manner as the wiper arm 2 except that, as already mentioned above, the elastomer spring 59 works as a volumetric compression spring while the elastomer spring 29 works as a linear compression spring.

Figure 13:
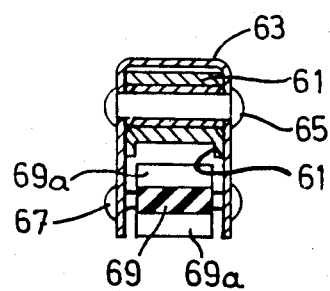
FIG. 13 is a section along line XIII—XIII of the wiper arm of FIG. 11.

FIGS. 11 and 13 show the sixth embodiment of the invention. The wiper arm 6 substantially comprises a mounting head 61, an elastomer spring 69, an arm extension 62 and an exterior housing 63 which, by means of the rivet 64 is rigidly linked to the arm extension 62. Just as before, the mounting head 61 comprises a hinge 65 for the exterior housing 63 and a hinge 66 for the elastomer spring 69.

At each of its two extremities, the elastomer spring 69 comprises an ear 69a,69b by means of which it is attached on one side to the hinge 66 of the mounting head 61 and on the other side to the rivet 67 which links together the two side walls of the exterior housing 63. When the arm extension 62 and the exterior housing 63 are turned clockwise about the hinge 65 of the mounting head 61, the elastomer spring 69 is being set under tension and consequently, when the arm extension 62 and the exterior housing 63 are released in a certain angular position with respect to the mounting head 61, the elastomer spring 69 pulls the wiper blade (attached to the free end of the arm extension 62) towards the surface to be wiped.

Figure 14:
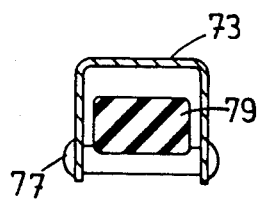
FIG. 14 is a section along line XIV—XIV of the wiper arm of FIG. 12.

The seventh and last embodiment of the invention is shown in FIGS. 12 and 14. According to this embodiment, the wiper arm 7 substantially comprises a mounting head 71, an elastomer spring 79 and an arm extension 72 rigidly secured to the exterior housing 73 by means of the rivet 74. The mounting head 71 comprises a hinge 75 for the exterior housing 73 and a recess or seat 76 for locating therein one of the end portions of the elastomer spring 79.

The exterior housing comprises a transverse rivet 77 on which rests the extremity of the elastomer spring 79 which is opposed to the mounting head 71. When the arm extension 72 and the exterior housing 73 are turned clockwise about the hinge 75, the rivet 77 forces the elastomer spring to act as a deflection spring (i.e. as a leaf spring) and consequently, when the arm extension 72 and the exterior housing 73 are released in a certain angular position with respect to the mounting head 71, the elastomer spring 79 pushes the arm extension (and consequently the wiper blade) towards the surface to be wiped.

The elastomer used for manufacturing the above mentioned springs can either be a polyurethane, or a cellular polyurethane, or a rubber and, substantially, they have the general form of a cylinder or of a pseudo-cylinder. It is to be understood that the term "psuedo-cylinder" includes forms which, in the geometrical sense, are not actually cylinders. Such forms are, for example, (a) pseudo-cylindrical forms of which the generatrix is not a straight line, but a broken line (FIGS. 2 and 8), a wavy line, or a zigzag line; and (b) pseudo-cylinders of which the transverse section is quite near to a rectangle or to a square (FIGS. 6, 9 and 10).

Several embodiments of a new invention have thus been described, but it is quite evident that the invention is not limited to these embodiments. Indeed, changes and/or modifications can be made without departing from the scope of the invention such as defined in the appended claims.

I claim:

1. In a wiper arm for a wiper blade, said arm having a mounting head, means for attaching the mounting head to a drive member, an arm extension carried by the mounting head, said arm extension having a top wall and a portion depending substantially perpendicular to the top wall, and means for mounting the wiper blade to the arm extension, the improvement comprising:
    an elastomer member; and
    means mounting the elastomer member between the mounting head and the substantially perpendicular portion of the arm extension, the elastomer member being under compression and biasing the arm extension towards a surface to be treated by the wiper blade.

2. A wiper arm according to claim 1, characterized in that the elastomer is a polyurethane.

3. A wiper arm according to claim 1, characterized in that the elastomer is a cellular polyurethane.

4. A wiper arm according to claim 1, characterized in that the elastomer is a rubber.

5. A wiper arm according to claim 1, characterized in that said elastomic member has the form of a straight cylinder or of a straight pseudo-cylinder.

6. A wiper arm according to claim 1, characterized in that said elastomic member has the form of a cylinder or of a pseudo-cylinder of which the cross section is substantially elliptical or substantially circular.

7. A wiper arm according to claim 1, characterized in that said elastomic member has the form of a cylinder or of a pseudo-cylinder of which the cross section is substantially rectangular or substantially square.

8. A wiper arm according to claim 1 wherein the top wall is a part of an exterior housing of the arm extension and is pivoted on the mounting head, said elastomer member is in direct contact, over most of its circumferential surface, with the exterior housing of the extension arm.

* * * * *

UNITED STATES PATENT AND TRADEMARK OFFICE
CERTIFICATE OF CORRECTION

PATENT NO.  : 4,615,067
DATED       : October 7, 1986
INVENTOR(S) : Christian Beneteau It is certified that error appears in the above-identified patent and that said Letters Patent is hereby corrected as shown below:

In the section entitled "I Claim" please correct the following:

Claim 5, line 2, elastomic should read elastomer

Claim 6, line 2, elastomic should read elastomer

Claim 7, line 2, elastomic should read elastomer

Signed and Sealed this

Twentieth Day of January, 1987

*Attest:*

DONALD J. QUIGG

*Attesting Officer*         *Commissioner of Patents and Trademarks*